United States Patent [19]
Ruland

[11] Patent Number: 6,104,831
[45] Date of Patent: Aug. 15, 2000

[54] METHOD FOR REJECTION OF FLICKERING LIGHTS IN AN IMAGING SYSTEM

[75] Inventor: Kevin Ruland, St. Louis, Mo.

[73] Assignee: Esco Electronics Corporation, St. Louis, Mo.

[21] Appl. No.: 09/209,097

[22] Filed: Dec. 10, 1998

[51] Int. Cl.$^7$ ....................................................... G06K 9/34
[52] U.S. Cl. ........................... 382/173; 382/199; 348/152
[58] Field of Search .................................. 382/103, 107, 382/173, 199, 219, 286; 348/152, 153, 154, 155

[56] References Cited

U.S. PATENT DOCUMENTS

| | | |
|---|---|---|
| 3,651,252 | 3/1972 | Land et al. . |
| 4,161,750 | 7/1979 | Kamin . |
| 4,257,063 | 3/1981 | Loughry . |
| 4,342,987 | 8/1982 | Rossin . |
| 4,364,030 | 12/1982 | Rossin . |
| 4,679,077 | 7/1987 | Yuasa . |
| 4,847,485 | 7/1989 | Koelsch . |
| 4,903,009 | 2/1990 | D'Ambrosia et al. . |
| 4,939,359 | 7/1990 | Freeman . |
| 4,949,074 | 8/1990 | D'Ambrosia et al. . |
| 4,952,911 | 8/1990 | D'Ambrosia et al. . |
| 4,967,183 | 10/1990 | D'Ambrosia et al. . |
| 5,091,780 | 2/1992 | Pomerleau .............................. 248/155 |
| 5,101,194 | 3/1992 | Sheffer . |
| 5,144,685 | 9/1992 | Nasar . |
| 5,231,663 | 7/1993 | Earl et al. . |
| 5,253,070 | 10/1993 | Hong . |
| 5,283,551 | 2/1994 | Guscott . |
| 5,289,275 | 2/1994 | Ishii et al. . |
| 5,305,390 | 4/1994 | Frey et al. . |
| 5,398,057 | 3/1995 | Tapp . |
| 5,422,981 | 6/1995 | Niki . |
| 5,465,308 | 11/1995 | Hutcheson et al. . |
| 5,493,273 | 2/1996 | Smurio et al. . |
| 5,517,429 | 5/1996 | Harrison . |
| 5,555,512 | 9/1996 | Imai et al. . |
| 5,576,972 | 11/1996 | Harrison . |
| 5,731,832 | 3/1998 | Ng ........................................... 348/155 |

OTHER PUBLICATIONS

Rafael C. Gonzalez & Paul Wintz, "Digital Image Processing," Addison–Wesley Publishing Company (Rading, Massacheusets), pp. 320–383, (Mar. 11, 1977).

Masahisa Kaneta, Kimiharu Kanemaru, Hitoshi Kanoh, Toshio Nagai, "Image Processing method for Intruder Detection around Poiwer Line Towers," Ieice Trans. Inf. & Syst., vol. E76 (No. 10), p. 1153–1160, (Oct. 10, 1993).

*Primary Examiner*—Phuoc Tran
*Attorney, Agent, or Firm*—Polster, Lieder, Woodruff & Lucchesi, L.C.

[57] ABSTRACT

A video surveillance system is disclosed which readily distinguishes between changes within an observed scene, caused by the presence of an intruder within the scene, and changes resulting from lighting variations. The video surveillance system implements a retinex-based algorithm for distinguishing the presence of a new object within the scene from changes in scene lighting. Areas of change between a current image (F1) of the scene and a reference image (RF) thereof are identified to produce a difference image. Response to significant differences present in the difference image, the entire current image and a subsequent image (F2) are partitioned into uniform segments ($SF1_1$–$SF1_n$, $SF2_1$–$SF2_n$), and ratios of changes in light intensity along the edges of the uniform segments are calculated for each partition. If a comparison of the resultant edge ratios between corresponding segments in the images indicates a change in the scene, the process is repeated for at least one subsequent image frame. If similar results are attained, the system signals an alarm condition to a monitoring station or a system operator.

6 Claims, 2 Drawing Sheets

METHOD FOR REJECTION OF FLICKERING LIGHTS IN AN IMAGING SYSTEM

CROSS-REFERENCE TO RELATED APPLICATIONS

U.S. patent application Ser. No. 08/772,595, filed Dec. 23, 1996.

STATEMENT REGARDING FEDERALLY SPONSORED RESEARCH OR DEVELOPMENT

Not Applicable.

BACKGROUND OF THE INVENTION

This invention relates to an imaging system, and more particularly, to a method used in a video surveillance system to prevent false alarms caused by the scene under observation changing due to flickering lights, as opposed to changes in the scene resulting from the presence of an intruder.

In co-pending and co-assigned U.S. patent application Ser. No. 08/772,595, there is described a video imaging system and method of image processing which is particularly useful in video surveillance security systems. As described in the co-pending application, changes between one frame of observed video and another are detected and isolated. If the changes result from a fluctuation in the irradiation of a surface within the field of view of the sensor obtaining the image, as opposed to the introduction of a new reflecting surface (possibly an intruder) into the field of view, the isolated change is recognized as such, and no alarm is triggered by the system. This has the desirable effect of reducing the number of false alarms to which a system monitor or operator must respond.

The methodology employed by the surveillance system to process the received video images is based upon the "retinex" theory developed by Edwin Land. According to the theory, a human observer of a scene can detect differences in reflectance between two surfaces, even if the amount of visible-light energy reflected from the respective surfaces is the same. Application of the retinex theory to areas of detected differences within an observed scene is described in the co-pending application.

One situation which must be addressed by any video surveillance security system, in preventing false alarms, is that of an intruder entering an observed scene which is continually subjected to transient lighting changes. An example of such a situation is where there is a flickering light (an advertisement sign, for example) which constantly switches on and off, resulting in fluctuating lighting conditions. The improvement of the present invention allows the security system to react to an environment subjected to such continuously changing lighting conditions, and to detect an intruder if one is present; but otherwise to not produce false alarms.

BRIEF SUMMARY OF THE INVENTION

Among the several objects of the present invention may be noted the provision of a video security system for visually monitoring a scene and detecting the presence of an intruder within the scene;

The provision of the aforementioned video security system which compares a current frame of a viewed video image with a reference frame to produce a difference frame containing any changes occurring between the frames;

The provision of the aforementioned video security system which partitions the resulting difference frame into a net of uniform regions;

The provision of the aforementioned video security system which includes a method for determining if any of the observed changes within the uniform regions are caused by lighting variations or by the presence of an intruder within the field of view;

The provision of the aforementioned video security system which is particularly useful in treating lighting variations resulting from flickering lights, such as lights being switched on and off, moving shadows caused by lights shining through a window, etc.;

The provision of the aforementioned video security system which is equally effective in recognizing small, localized changes caused by flickering lights, as well as those caused by global lighting changes; and The provision of the aforementioned video security system which is responsive to the results of the image processing to quickly and positively signify an alarm condition to a system monitor.

In accordance with the present invention, generally stated, a video surveillance system is disclosed which readily distinguishes between changes within an observed scene, caused by the presence of an intruder within the scene, from apparent changes resulting from lighting variations occurring within the scene. Lighting variations may be caused by flickering lights, moving shadows, or the like. The retinex-based video surveillance system implements an algorithm for distinguishing the presence of a new object within the scene from changes in scene lighting. The system identifies the areas of change between a current image of the scene and a reference image thereof, to produce a difference image. The entire difference image is then partitioned into a net of uniformly defined regions. Ratios of changes in light intensity along the edges of objects within each region are calculated for the partitioned difference image. If a resultant edge ratio indicates a change in the region of the partitioned difference image, the edge ratio calculation is repeated for all regions of the partitioned difference image. A further calculation is then performed to determine in how many of the regions an edge ratio threshold value is exceeded. The change in edge ratios exceeding the threshold value is representative of a change being caused by introduction of an intruder into the scene. If the number of regions where the threshold value is reached exceeds a preselected number, the process is repeated for a number of successive difference image frames, and if similar results are attained, an alarm condition is signaled to a monitoring station or a system operator.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

Figure 1:
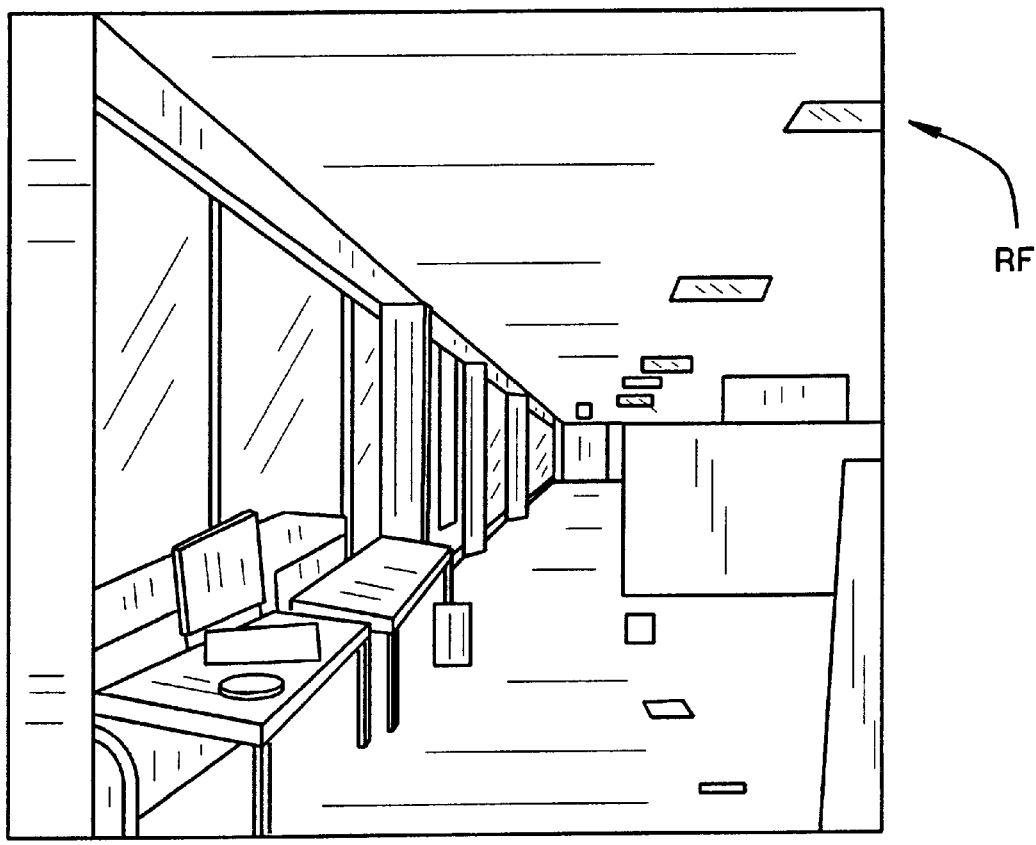
FIG. 1 is an illustration of an exemplary video image reference frame observed by the video security system of the present invention, with significant edges emphasized.

The following detailed description illustrates the invention by way of example and not by way of limitation. The description clearly enables one skilled in the art to make and use the invention, describes several embodiments, adaptations, variations, alternatives, and uses of the invention, including what we presently believe is the best mode of carrying out the invention.

As described in the above referenced co-pending application, operation of a video security system is such that non-uniform segments or regions of an observed image of a scene which differ from non-uniform segments or regions of an earlier observed image of the same scene are identified. These difference segments are then individually evaluated to determine if the differences are caused by a lighting change within the scene or by movement of an intruder. If a detected change is caused by an intruder, an alarm is given. If, however, the differences result from global or local lighting changes, the effects of motion of spatially constrained objects such as fans, screen-savers, etc., established within the scene, noise, or aliasing effects, they are recognized as such, and no alarm signal is generated.

Operation of the video security system in the co-pending application is based upon Edwin Land's retinex theory of how the human visual system identifies differences in surface characteristics of objects despite variations in illumination over a scene. According to Land's theory, even if the amount of energy reflected from two different surfaces is the same, a human can detect any differences which exist in the lightness of the two surfaces. Essentially, the human visual system has the ability to identify surface differences while ignoring lighting differences. Land asserted that this ability is derived from a comparison of received energies across surface boundaries in the observed scene. At any boundary, light gradients make no difference because the received energies from adjacent regions on opposite sides of a boundary are in a correct ratio. A person's judgments about the lightness of widely separated regions results from unconsciously making numerous comparisons of lightness across the boundaries of several intervening regions. This retinex theory of color vision explains why surface colors appear very stable to a person even though the degree of illumination may vary significantly.

In employing the retinex process, it is assumed that only gradual spatial variations exist in the scene irradiance. While this generally holds true for diffuse lighting, it may not hold for directional light sources. The intrusion of a light beam into a scene can introduce sharp shadows, or for example, change the amount of light striking a vertical surface without similarly changing the amount of light striking an adjacent angled surface. This also holds true for flickering lights where there may be high degree of light intensity at one moment, but a low intensity the next. In these situations, the ratios of light intensity between pixels comprising the observed images which straddle a shadow line at one instance, or the surfaces the next instance, will change even though no object has been introduced into the scene.

But, as pointed out in the co-pending application, even in these situations, with an image resolution of 512 by 484 pixels, the pixel-to-pixel change is often less than it appears to a human observer, and the changes only appear at the shadow boundaries, not within the interiors of the shadows or surfaces. Establishing a threshold on "hits" or "detections" allows the system to tolerate a number of these situations without triggering an alarm.

Alternatively, edge mapping techniques can be employed to distinguish intruders from lighting fluctuations. Edge mapping is employed after an initial detection stage and is triggered by a predetermined number of pixel value changes in consecutive image frames. Within each detected non-uniform segment or region of the difference image corresponding to a detected difference between the reference frame and the observed frame, an edge map is created for both the reference frame and the observed frame that triggered an alert. The edge map is constructed by employing an edge enhancement filter (such as a Sobel filter) and then thresholding the results. If the observed change is just a lighting variation, then the edges within the non-uniform segment or region are essentially unchanged. However, if the observed change is the result of the intrusion of a new object within the scene, then some edges present in the non-uniform portion of the reference frame will be obscured in the corresponding non-uniform portion of the observed frame and some new edges, internal to the intruding object, will be introduced.

The retinex-based video security system described in the above-reference co-pending application describes the application of a combination of pure retinex and edge-mapping techniques to distinguish between lighting variations and intruders in those non-uniform segmented areas or regions of a difference image identified as containing pixel changes. Only those non-uniform segmented areas or regions within a difference image which are identified as differing from the same regions or segments in the previous image are evaluated by the combined techniques.

The method employed by the video security system of the present invention disclosed herein utilizes the combination of retinex theory and edge-mapping to discern surface differences in an observed scene and to ignore fluctuations in scene illumination which occur during the observation of the scene. Rather than applying the aforementioned techniques only to those non-uniform segments or regions of a difference image identified as having changed in consecutive image frames, the video surveillance system of the present invention is configured to apply the combined retinex/edge-mapping technique to the entire difference image in the event predetermined conditions are met.

Prior to evaluating an individual frame of video received from a video camera observing a scene, the video security system establishes a reference frame RF (see FIG. 1) against which subsequent individual frames of video are compared. The reference frame may either be a previously stored image of the scene, the first video frame of the scene captured upon activation of the system, or any individual frame of the scene captured by the system prior to the video-capture of the current frame which is to be evaluated. Those skilled in the art will recognize that these and numerous other methods for obtaining and updating a reference frame or image may be employed, and are considered within the scope of this invention.

Figure 2:
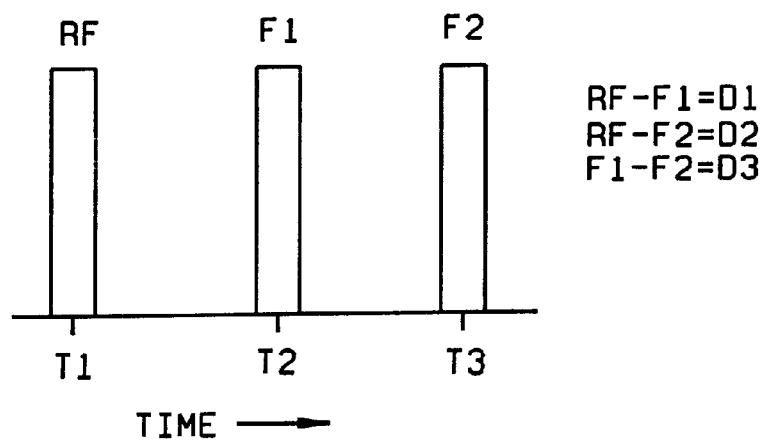
FIG. 2 is a timeline chart illustrating the sequence of image frame acquisition by the video security system.

Turning to FIG. 2, once the reference frame or image RF is obtained at time T1, the video security system captures a first video image F1 of the scene at a subsequent point in time T2, for comparison with the reference image. The first video image and the reference image are compared, preferably on a pixel-by-pixel basis, to create a difference image D1 containing the differences between the current image and the reference image. One method of creating a difference image is by simple pixel subtraction, wherein the value for a pixel in the current image is subtracted from the value of the corresponding pixel in the reference image, the resulting values establishing the respective pixel values in the difference image. Those skilled in the art will recognize that alternative methods for generating the difference image are well known, and may be utilized within the scope of this invention.

In the event a significant difference is detected between reference frame RF and first image frame F1, the video security system captures a second image frame F2 of the scene at a subsequent time T3, which is then compared against both the reference frame and the first image frame to produce two additional difference images D2 and D3. Only if there are significant differences detected between frame F2 and reference frame RF and between frame F2 and frame F1, is there considered to be a possibility of an intrusion warranting further investigation, i.e., image processing.

Figure 3:
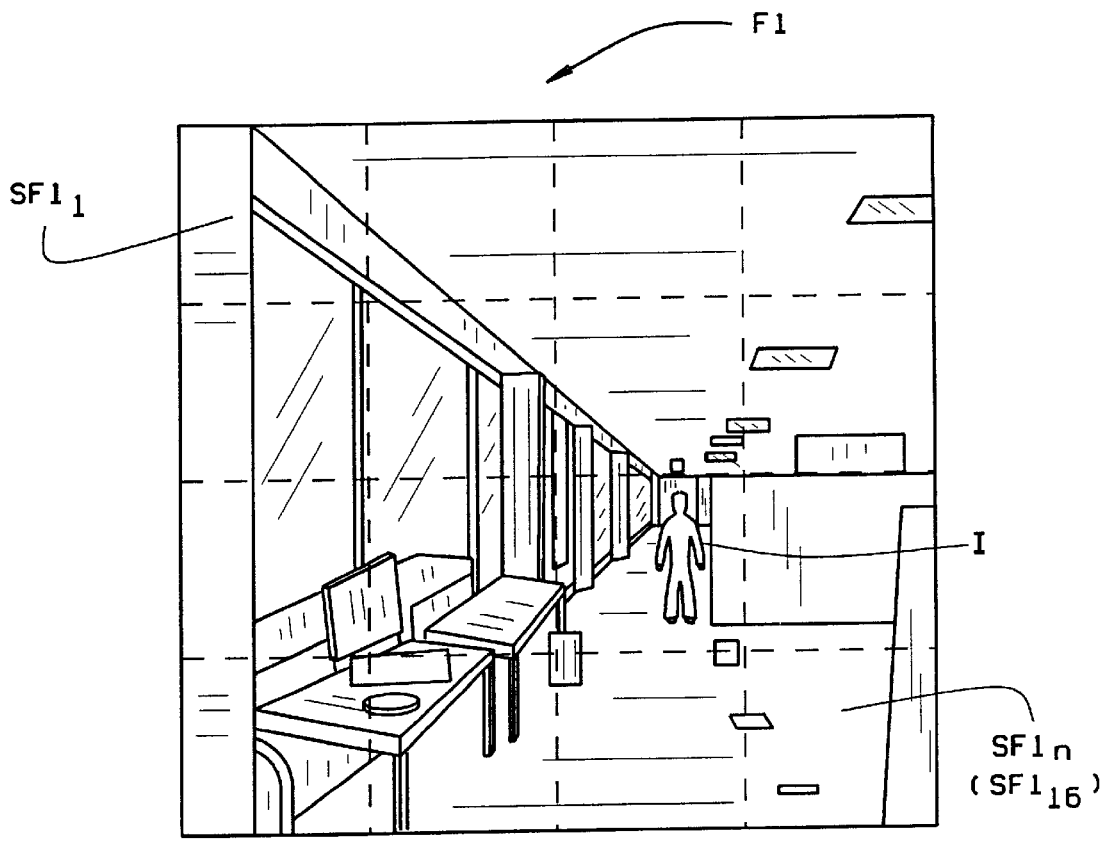
FIG. 3 is an illustration of an segmented exemplary video image frame wherein an intruder is present.

As shown in FIG. 3, the first image F1 is partitioned into a uniform grid of segments or regions $SF1_1$–$SF1_n$, where n is the total number of segments into which image F1 is partitioned. While it is preferred that the image have an equal number of segments or regions defining both horizontal and vertical rows of the uniform grid, the grid may be rectangular in nature, such that either the horizontal or vertical rows contain a greater number of segments, provided the size of each segment or region is uniform. Frame F2 (not shown) is correspondingly partitioned into a uniform grid of segments or regions $SF2_1$–$SF2_n$, each identical in size and placement to segments or regions $SF1_1$–$SF1_n$.

Figure 4:
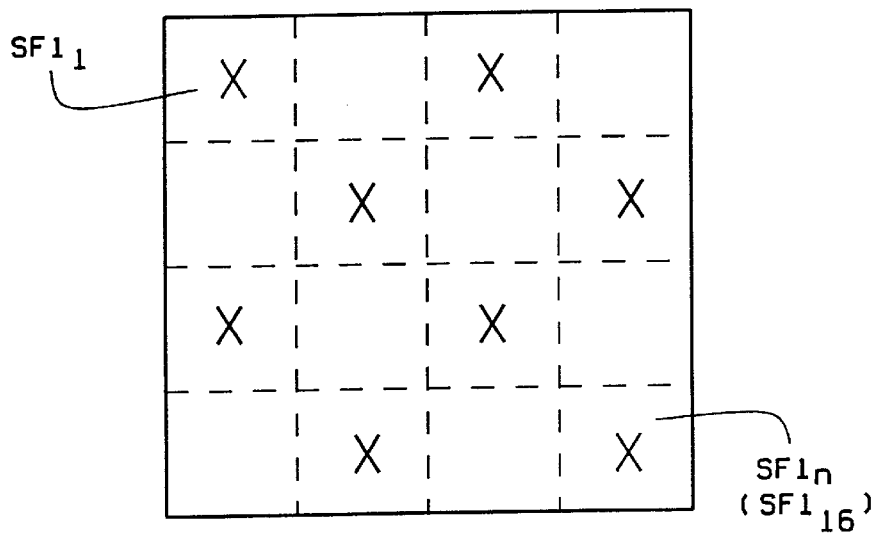
FIG. 4 is a grid, representative of a segmented image, with selected image segments indicated therein.

A predetermined number of corresponding segments or regions are next selected from the partitioned segments or regions $SF1_1$–$SF1_n$ and $SF2_1$–$SF2_n$ for evaluation by the security system. In the preferred embodiment, one-half of the segments in the partitioned image frame F1 are selected in an alternating pattern, corresponding, for example, to the black squares on a checkerboard (FIG. 4). In alternate embodiments, the number of selected segments or regions may be either increased or decreased, and the position of the segments or regions within the partitioned images chosen by either an alternate predetermined pattern, or by random selection. The segments selected from partitioned image frame F2 correspond exactly to those selected from image frame F1.

The selected segments or regions are next evaluated using the combined retinex/edge-mapping algorithm disclosed in the above-referenced co-pending application Ser. No. 08/772,595. The basic premise of the variable light rejection algorithm described therein is to compare reflectance ratios of adjacent pixels comprising the selected segments $SF1_1$–$SF1_n$ from frame F1 with the ratios from corresponding pixel pairs in the selected segments $SF2_1$–$SF2_n$ from frame F2, but to restrict the ratios to those across significant edges occurring within the selected segments or regions. Restricting the processing to ratios of pixels occurring over significant edges eliminates the dilution of information caused by the presence of large uniform areas in the selected segments.

The number of selected image segments wherein a significant number of pixel-pair ratios has changed from frame F1 to frame F2 is determined. If this number exceeds a predetermined threshold, preferably one-half of the selected image segments, the entire evaluation procedure is repeated for a predetermined number of consecutive image frames. If these subsequent evaluations each yield a number of selected image segments exceeding the predetermined threshold, a low level alarm signal indicative of an intrusion within the image scene not caused by changes in ambient light is signaled to a monitor or system operator. Further, the video surveillance system will further process the image information to determine if an intruder I, such as shown in FIG. 3, is present, so the intruder can be classified in accordance with the teachings of co-pending application Ser. No. 08/772,595.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. In a security system distinguishing between changes within a scene caused by the presence of an intruder as opposed to ambient lighting fluctuations affecting scene illumination, the improvement of a method for making such a distinction when lighting changes within the scene are produced by flickering lights, comprising:

obtaining a first image of the scene;

comparing the first image with a reference image of the scene and obtaining therefrom a difference image composed of a set of differences between the two images;

responding to said set of differences exceeding a threshold by obtaining a second image of the scene subsequent to obtaining said first image;

comparing said second image with a reference image of the scene and obtaining therefrom a second difference image composed of a second set of differences between the two images;

comparing said second image with said first image and obtaining therefrom a third difference image composed of a third set of differences between the two images;

responding to said second and third sets of differences exceeding said threshold, identically partitioning said first and second images into a plurality of uniform segments; and comparing a portion of said plurality of uniform segments from the first image with corresponding uniform segments from the second image to determine if any differences between the respective images result from changes in the irradiation of surfaces in the scene caused by fluctuations in ambient lighting of said scene.

2. In the method of claim 1, responding to said comparison determining the differences between the respective images as not resulting from changes in the irradiation of surfaces in the scene to obtain at least one subsequent image which is partitioned and then compared with at least one previously obtained image, a predetermined number of said subsequent image comparisons not indicative of changes in surface irradiation in said scene correspondingly indicating of an intrusion.

3. In the method of claim 1, each of said difference images being created by pixel subtraction.

4. The method of claim 1 wherein said identical partitioning of said first and second images into a plurality of uniform segments yields a grid of uniform segments.

5. The method of claim 1 wherein comparing a portion of said plurality of uniform segments from the first image with corresponding uniform segments from the second image to determine if any differences between the respective images result from changes in the irradiation of surfaces in the scene caused by fluctuations in ambient lighting of said scene includes:

identifying surface edges within each uniform segment;

determining ratios of reflectance for pairs of adjacent pixels separated by said identified edges; and comparing said determined ratios from said first image uniform segments with determined ratios from corresponding pixel pairs in said second image uniform segments, the number of differences between said compared ratios less than a predetermined number indicating of a change in said ambient lighting of said scene.

6. A method of distinguishing between changes within a scene caused by the presence of an intruder as opposed to ambient lighting fluctuations affecting scene illumination, comprising:

viewing the scene to capture video images of the scene at different points in time;

processing each video image of the scene, said processing including comparing a captured video image representing the scene at one point in time with a captured video image representing the scene at a previous point in time, and accumulating differences between the captured video images;

responsive to the number of said accumulated differences exceeding a predetermined threshold for a sequence of captured video images, evaluating at least two captured video images to determine if the differences therebetween are caused by surface differences indicative of the presence of an intrusion within the scene, or illumination changes which do not indicate the presence of an intruder; and wherein evaluating said captured video images includes:

(a) segmenting each entire image into a plurality of identically disposed uniform image segments;

(b) selecting from each segmented image a predetermined number of identically disposed uniform image segments for further processing;

(c) identifying within said selected image segments pixel pairs disposed across significant edges of surfaces contained within said segments;

(d) calculating the reflectance ratios of said adjacent pairs of pixels;

(e) comparing the calculated reflectance ratios for pixel pairs in each image segment selected from a first image with the corresponding pixel pair ratios for each image segment selected from a second image;

(f) determining the number of image segments wherein said compared reflectance ratios differ between said first and second images; and (g) responsive to said number of image segments having different reflectance ratios exceeding a predetermined threshold, repeating steps (a)–(f) for at least one subsequent image frame and captured image frame, and responsive to said repeated steps producing a number of image segments having different pixel ratios, identifying said differences as caused by an intrusion within said scene.

\* \* \* \* \*